United States Patent Office 3,234,168
Patented Feb. 8, 1966

3,234,168
DIRECT SOLUTION PREPARATION OF
AROMATIC POLYESTERS
Weston Andrew Hare, Northfield, Wilmington, Del.,
assignor to E. I. du Pont de Nemours and Company, Wilmington, Del., a corporation of Delaware
No Drawing. Filed Apr. 18, 1962, Ser. No. 188,531
8 Claims. (Cl. 260—30.4)

This invention relates to a novel process for the preparation of a class of high molecular weight wholly aromatic polyesters and for the conversion of these polymers to shaped articles, particularly fibers and films.

It is an object of this invention to provide a novel process for preparing a class of high molecular weight wholly aromatic polyesters by a solution polymerization technique and directly converting the polymers to shaped article form.

Other objects will become apparent from the following description.

In accordance with these objects, there is provided a process for the preparation of solutions of a class of high molecular weight wholly aromatic polyesters which comprises the steps of reacting 4,4'-isopropylidenebis(2,6-dichlorophenol) with an aromatic dicarboxylic acid halide or a mixture of such aromatic dicarboxylic acid halides in the presence of certain cyclic organic oxygen-containing solvents and specified acid acceptors, and utilizing the resulting solutions directly for the preparation of shaped articles. The condensation is normally effected at temperatures within the range of $-10°$ C. to $30°$ C. by vigorous stirring of the reaction mixture for a period within the range of 2 hours to 5 hours. The resulting solution, with or without intermediate purification steps, is extruded through a suitable orifice for conversion to shaped articles.

As the aromatic dicarboxylic acid halide reactant there may be used the acid chloride or bromide or mixtures of various acid halides. It is preferred that isophthaloyl chloride be employed, but other aromatic dicarboxylic acid halides, as terephthaloyl chloride, 1,3-naphthalene dicarboxylic acid chloride, and other similar acid halides may be employed, either alone or in mixture with isophthaloyl chloride. The mole ratio of halide to phenol will ordinarily range from between about 0.95 to 1.05, preferably about 1.00.

The condensation polymerization may be effected in an organic solvent of the class of 5 and 6 membered ring cyclic compounds having less than 9 carbon atoms and containing only C, H, and O atoms. The oxygen is present as an ether or a ketone. Suitable solvents contain no carbon-to-carbon unsaturation. Among operable solvents may be named cyclopentanone, tetrahydrofuran, cyclohexanone, tetrahydropyran, and other similar materials. It has been found that this class of solvents makes possible the formation of solutions which are not characterized by a tendency for the polymer to be converted to a crystalline state. This phenomenon of crystallization from solution is frequently noted with polymers of this class. Additionally, the solvents of this class are found to be substantially inert to the aromatic dicarboxylic acid halides or the bisphenol utilized in the preparation of the polyesters. While the quantity of solvent to be used is not critical, it will generally comprise between about 60% and 90% of the reaction mixture.

The reaction between acid halide groups and phenolic groups is characterized by the evolution of a hydrogen halide. It is thus necessary to include in the reaction mixture a substance capable of reaction with the acidic gas produced for the reaction to proceed to completion.

It has been found that tertiary aliphatic amines constitute a particularly desirable class of acid acceptors and an amount at least sufficient to neutralize the acidic gas is employed. For utility in this capacity, the acid acceptor chosen must have a high base strength (i.e., a pKa value of at least about 9 when measured in water at a temperature of $25°$ C.). Such amines as trimethylamine, triethylamine, and higher homologs of this series, containing no more than 15 total carbon atoms including those amines which contain points of carbon-to-carbon unsaturation, as triallylamine, are particularly of utility. Such amines are capable of reaction with the hydrogen halide evolved, thereby being converted to the corresponding amine hydrohalides. These amine hydrohalides may be isolated from the polymeric product either by filtration from the solution, if they are found to be insoluble in the solvent medium, or by extraction into the coagulating bath, if they are soluble in the reaction solution. It is preferred that acid acceptors be chosen such that their hydrohalides are soluble in the solvent chosen for the reaction, inasmuch as they are more conveniently isolated by washing or extraction than by filtration. In some instances, isolation may be more easily effected by the addition of a suitable quantity of water or other solvent for the amine hydrohalide to redissolve any which has precipitated, making possible the removal of the acid acceptor by extraction into the coagulating bath and obviating the necessity for removal of the solid prior to the formation of shaped articles. Other separation techniques, as centrifugation, may be employed with equally satisfactory results.

The method chosen for isolation of the solid amine hydrochloride salt depends, to a large extent, upon the crystalline form of the salt produced. This is, in turn, largely a function of the polymerization solvent chosen. Thus, when dry tetrahydrofuran is utilized as the reaction solvent, the amine hydrochloride is normally formed as a very finely divided solid which packs readily. This results in a slurry which is filtered only with difficulty due to the clogging of the filter by the dense filter cake. The tight packing, on the other hand, makes possible more complete separation by centrifugation, inasmuch as the solution tends to be forced out of the salt cake. For this reason, when tetrahydrofuran is employed as the solvent for polymerization, it is desirable that means other than filtration be employed for salt removal or that the salt be converted to a form such that it is more easily removed. This may be effected, for example, by the addition of a small quantity of water to the polymerizing mixture, promoting the formation of a coarser crystalline form.

Alternatively, separation of the salt by filtration may be readily effected if the polymerization reaction is conducted in two stages, during the first of which only 90–95% of the stoichiometric quantity of one of the difunctional reactants is present, and during the second of which the remaining 10–5% of this reactant is employed. The principal product of the first stage is thus a low molecular weight polymer, in the form of a non-viscous solution in the reaction solvent. Since 90–95% of the total salt yield is produced in this first stage, this quantity of salt may be readily removed by filtration of the non-viscous solution. Upon completion of the second stage of the polymerization, a highly viscous solution of the high molecular weight polymer is produced, making filtration difficult; only a small quantity of salt must be removed from this solution. Where solvents other than tetrahydrofuran are utilized as the polymerization medium, the salt is normally precipitated in a more easily filtered crystalline form.

The polymerization reaction effected in accordance with this invention is normally carried out at a relatively low temperature, i.e., within the range of about $-10°$ C.

to 30° C. It is normal to introduced the reactants previously dissolved in the chosen solvent to a reaction vessel such that they can be stirred vigorously during the course of the reaction. Concentrations may be so chosen that the polymer concentration of the final solution is at any preferred value. Stirring is usually continued for a period of about 2 hours to 5 hours, or until the polymer is noted to possess an inherent viscosity of at least about 0.4. Following the removal of any solid by-products, as amine hydrohalides, by filtration, centrifugation, or other physical means, or by redissolving in the solvent medium by the addition of water or other suitable solvents, the solution may be utilized directly for conversion to shaped articles.

The preparation of shaped articles comprising these polymers is readily effected, for example, by the extrusion of the polymer-containing solutions through a suitable orifice into a coagulating medium, which serves to solidify the polymeric material in a predetermined shape, and to extract from the polymer the solvent, acid acceptor, and any unreacted starting materials. It is preferred that the extrusion be effected at a temperature within the range of between about 0° and about 25° C. Among suitable coagulating media are included water, mixtures comprising water and the reaction solvent (as water-tetrahydrofuran mixtures, water-cyclopentanone mixtures, etc.), acetone and low molecular weight alcohols.

The fibers prepared by the wet-spinning of the solutions prepared in accordance with this invention are characterized by excellent properties, and find utility in the preparation of fabrics having pleasing aesthetics and good wash-wearability. The fibers vary in cross-sectional shape, depending upon their method of preparation. If spinning is effected through normal round spinneret orifices, the fibers are found to possess a typical "dog-bone" shaped cross section. Spinning of the solutions through rectangular spinneret openings produces filaments having cross sections ranging from the shape of the letter "U" through that of the letter "C" to an annular, "doughnut," or "closed C" shape.

Shaped articles may also be readily prepared by dry-spinning techniques in accordance with recognized procedures, by passing polymer solutions prepared in accordance with this invention through a suitable orifice into an evaporative atmosphere. By this technique, the polymeric material is solidified in a predetermined shape, and may be purified of unreacted starting materials, acid acceptor, and the like by washing or other comparable procedure. Filaments prepared by this technique are of utility in the preparation of the same types of fabrics referred to above, having pleasing aesthetics and good wash-wearability.

The following examples are illustrative of the practice of preferred embodiments of the invention. In these examples, parts and percentages are expressed on a weight basis unless otherwise indicated, and inherent viscosities ($\eta$inh) have been determined in accordance with the following equation:

$$\eta\text{inh} = \frac{\ln \eta \text{rel}}{c.}$$

The relative viscosity ($\eta$rel) may be determined by dividing the flow time in a capillary viscometer of a dilute solution of the polymer by the flow time for the pure solvent. The concentration (c.) used in the examples is 0.5 gram of polymer per 100 ml. of solution, and the measurements are made at 30.0° C. The solvent in which the viscosity is determined is indicated in each instance where a value is reported.

*Example I*

A three-necked, round-bottom flask equipped with a stirrer, addition funnel, and reflux condenser topped with a calcium chloride drying tube is flushed with nitrogen. To the flask are added 9.152 grams (0.025 mol) of twice-recrystallized 4,4'-isopropylidene bis(2,6-dichlorophenol), 5.127 grams (0.025 mol plus 1% excess) of isophthaloyl chloride, and 50 ml. of freshly distilled tetrahydrofuran. The flask and its contents are cooled in an ice-water bath during the dropwise addition of a solution of 5.16 grams (0.057 mol) of triethylamine in 10 ml. of distilled tetrahydrofuran. Salt begins to precipitate immediately, and an additional 0.5 ml. of triethylamine is added. Stirring is continued while the viscous mixture slowly warms to room temperature, and for an additional 2.5 hours at room temperature. The mixture is then filtered through a filter cloth under 20 to 25 p.s.i. of air pressure. The resulting clear, viscous solution contains 20% polymer, and may be utilized for the casting of tough films. The polymer may be isolated from solution by precipitation with water, and following washing and drying, is found to exhibit a polymer melt temperature of 315° C. and an inherent viscosity in tetrahydrofuran of 1.00.

*Example II*

By a procedure analogous to that described in the preceding example, the preparation of the polyester from isophthaloyl chloride and 4,4'-isopropylidene-bis(2,6-dichlorophenol) is effected on a larger scale. In a 4-liter flask equipped with a helical stirrer, an addition funnel, and a reflux condenser are placed 203 grams (1 mol) of the recrystallized acid chloride, 366 grams (1 mol) of the recrystallized bisphenol, and 2 liters of freshly distilled tetrahydrofuran. The solution is cooled by immersion of the flask in an ice bath and a solution of 213 grams (2 mols plus 5% excess) of freshly distilled triethylamine is added over a period of one hour. To the relatively viscous mixture is added an additional 10 ml. portion of triethylamine, and the temperature is permitted to rise slowly to within the range between 20° C. and 25° C. The viscous mixture is stirred for an additional two hours, and diluted with additional solvent to reduce polymer concentration to 16%. The polymer formed exhibits an inherent viscosity of 0.80, when measured in tetrahydrofuran.

*Example III*

A portion of the reaction mixture from the preceding example is filtered to remove the precipitated salt. Filtration is effected by passage through a filter cloth in a pressure filter utilizing air pressures up to about 90 pounds per square inch. The filter cake gradually becomes more dense and filtration becomes progressively more difficult. A clear viscous solution of the polymer in tetrahydrofuran is obtained. From this solution, filaments are prepared by extrusion through a conventional spinneret into a water bath. Following drawing by passing the filaments over a hot plate maintained at a temperature of 230° C., the filamentary product is found to exhibit a tenacity/elongation/modulus ratio of 1.5/20/33. Fibers are also obtained by dry spinning the polymer solution.

*Example IV*

A second portion of the reaction mixture from Example II is centrifuged to remove the precipitated salt. Centrifugation is effected in a super centrifuge, operating at 40,000 revolutions per minute. The fine salt crystals pack tightly at the bottom of the centrifuge tubes, tending to force out the polymer solution. Centrifugation is continued for a period of about 30 minutes, following which the clear, viscous solution is decanted. The solution is utilized for the spinning of fibers by the same procedure as that described in Example III.

*Example V*

To a reaction flask equipped with a stirrer are added 300 grams (316.5 ml.) of freshly distilled cyclopentanone 54.9 grams (0.15 mol) of twice recrystallized 4,4'-isopropylidene-bis(2,6-dichlorophenol), and 30.3 grams (0.30 mol) of triethylamine. The mixture is cooled to a temperature of about 10° C. with stirring, and blanketed with nitrogen. While maintaining the temperature at 10° C., 30.45 grams (0.15 mol) of isophthaloyl chloride are added over a period of 35 minutes. The mixture becomes viscous, and a white slurry of the amine hydrochloride is formed. Upon filtration of the mixture through either a sintered glass filter or a cotton felt filter, a clear, viscous solution is obtained. Wet spinning of the solution into water by conventional techniques produces fibers. The polymer produced by this process exhibits an inherent viscosity of 1.24. The filtered solution is stable for a period of several days, with no evidence of crystallization of the polymer.

*Example VI*

To a reaction flask are added 300 grams (318 ml.) of freshly distilled cyclohexanone, 54.9 grams (0.15 mol) of twice-recrystallized 4,4'-isopropylidene-bis(2,6-dichlorophenol), and 30.3 grams (0.30 mol) of triethylamine. While stirring the mixture under nitrogen, it is cooled to a temperature of 10° C. and maintained at that temperature during the addition of 30.45 grams (0.15 mol) of isophthaloyl chloride over a period of 35 minutes. A viscous solution with dispersed solid amine hydrochloride is produced. The solution is diluted to 15% solids by the addition of a fresh portion of solvent, and filtered through sintered glass. The polymer in the resulting solution exhibits an inherent viscosity of 0.77, and the solution is suitable for conversion to fibers, films, and other shaped articles. A portion of the final solution exhibits no tendency to precipitation of the polymer upon storage at room temperature for a period of two weeks.

*Example VII*

A three-necked, round-bottom flask, equipped with a nitrogen inlet, a stirrer, and an addition funnel topped with a calcium chloride drying tube, is charged with 3.66 grams (0.01 mol) of twice-recrystallized 4,4'-isopropylidene-bis(2,6-dichlorophenol), 2.03 grams (0.01 mol) of distilled and recrystallized isophthaloyl chloride, and 40 ml. of freshly distilled and sodium-dried tetrahydrofuran. Upon stirring without heating, a solution results, to which is added dropwise a solution of 2.74 grams (0.02 mol) of triallylamine in 3 ml. of dry tetrahydrofuran over a period of 15 minutes. Polymerization is immediately initiated, as evidenced by the warming of the flask due to the exothermic reaction. Following 2½ hours of total reaction time at room temperature, the viscous solution contains no precipitated amine hydrochloride, indicating that the hydrochloride of triallylamine is soluble in tetrahydrofuran. The resulting solution may be utilized for the preparation of tough films without requiring filtration. The polymer exhibits an inherent viscosity of 0.40.

*Example VIII*

By a procedure analogous with those described previously, to a three-necked, round-bottom flask are added 9.152 grams (0.025 mol) of 4,4'-isopropylidene-bis(2,6-dichlorophenol), 5.127 grams (0.025 mol) of isophthaloyl chloride, and 50 mls. of tetrahydrofuran. Into the resulting solution is bubbled a 5-ml. portion of trimethylamine which had been previously purified by condensation into a Dry Ice group containing bis(4-isocyanatophenylmethane) for removal of active hydrogen-containing contaminants, and distilled. The reaction mixture, which had been cooled by means of an ice bath is permitted to warm to room temperature over a one-hour period, while being stirred. Upon filtration of the resulting slurry to effect removal of the solid trimethylamine hydrochloride, a clear viscous solution results, suitable for the casting of films or the spinning of fibers. A portion of the polymer is precipitated and found to exhibit an inherent viscosity of 0.74, when measured in tetrahydrofuran.

*Example IX*

Repetition of Example I utilizing, as reaction solvent, 50 ml. of tetrahydrofuran containing 0.5 ml. of water produces a comparable polymer. The advantage of the small quantity of water may be seen in the fact that coarse agglomerated crystals of the amine hydrochloride are produced, rather than the very fine crystals noted when anhydrous tetrahydrofuran is employed. Filtration of the resulting slurry proceeds much more rapidly, and the crystals do not tend to plug the filtration medium.

*Example X*

By a procedure analogous with that employed in Example II, the polyester from isophthaloyl chloride and 4,4'-isopropylidene-bis(2,6-dichlorophenol) is prepared. Removal of the solid amine hydrochloride is effected by the addition to the mixture of 250 ml. of water. The salt is dissolved in the water, and the two-phase system is separated by centrifugation. The lower, aqueous layer contains the salt and is discarded. The top layer comprises the solution of the polymer in tetrahydrofuran. The polymer is found to exhibit an inherent viscosity of 0.48, and the solution is suitable for the formation of films, filaments, and other shaped articles.

The process of this invention makes possible the preparation directly of solutions of a class of aromatic polyesters which are suitable for conversion to shaped articles without further purification or treatment. This process is particularly advantageous inasmuch as it is not necessary to isolate the polymeric product from its preparative medium and redissolve it in a suitable solvent for the formation of shaped articles. Isolation and redissolving were required heretofore to avoid premature polymer precipitation and poor fiber formaion in spinning salt-laden solution. Surprisingly the instant process provides a medium with strong enough solvent action for the resulting polymer and that does not interfere with polymer formation. Moreover, greater stability of spinning solution is obtained than could be achieved by isolating and redissolving the polymer.

What is claimed is:

1. A coupled process for preparing high molecular weight aromatic polyesters and directly extruding the same into shaped articles which comprises reacting 4,4'-isopropylidene-bis(2,6-dichlorophenol) with an aromatic dicarboxylic acid halide in the presence of a solvent and an acid acceptor, said solvent being selected from the group consisting of cyclopentanone, tetrahydrofuran, cyclohexanone and tetrahydropyran, and said acid acceptor having a pKa value of at least about 9 when measured in water at a temperature of 25° C., adjusting the solvent content to the desired value and directly extruding the spinning solution through an orifice with removal of the solvent to solidify the polymeric material in a predetermined shape.

2. The process of claim 1 wherein the aromatic dicarboxylic acid halide is isophthaloyl chloride.

3. The process of claim 1 wherein the acid acceptor is a tertiary aliphatic amine.

4. The process of claim 3 wherein the amine salt which forms during the reaction is removed from the spinning solution prior to extrusion through the orifice.

5. A process for preparing high molecular weight aromatic polyesters, which comprises, reacting 4,4'-isopropylidene-bis(2,6-dichlorophenol) with an aromatic dicarboxylic acid halide in the presence of a solvent and an acid acceptor, said solvent being selected from the group consisting of cyclopentanone, tetrahydrofuran, cyclohexanone, and tetrahydropyran, and said acid acceptor having a pKa value of at least about 9 when measured in water at a temperature of 25° C.

6. The process of claim 5 wherein the aromatic dicarboxylic acid halide is isophthaloyl chloride.

7. The process of claim 5 wherein the acid acceptor is a tertiary aliphatic amine.

8. A process for preparing a high molecular weight polyester, which comprises, reacting 4,4'-isopropylidene-bis(2,6-dichlorophenol) with isophthaloyl chloride in the presence of tetrahydrofuran and triethylamine.

References Cited by the Examiner

UNITED STATES PATENTS

| | | | |
|---|---|---|---|
| 2,902,518 | 9/1959 | Hurdis et al. | 260—47 |
| 3,030,331 | 4/1962 | Goldberg | 260—30.4 |
| 3,043,800 | 7/1962 | Schnell et al. | 260—47 |
| 3,160,602 | 12/1964 | Kantor et al. | 260—47 |

OTHER REFERENCES

Conix, "Thermoplastic Polyester from Bisphenols," Industrial Engineering Chemistry, February 1959, pages 147–150.

Hill, "Fibers from Synthetic Polymers," Elsevier's Polymer Series, Elsevier Publishing Co., New York, 1953, page 260.

References Cited by the Applicant

UNITED STATES PATENTS 2,840,537   6/1958   Kleine et al.

OTHER REFERENCES

J. Am. Chem. Soc., 51, 2560–70 (1929), Carothers et al.

Hill, "Fibers from Synthetic Polymers," Elseiver's Polymer Series, Elsevier Publishing Co., New York, 1953, pages 396–397.

MORRIS LIEBMAN, *Primary Examiner.*